United States Patent
Linzer et al.

(10) Patent No.: US 9,144,839 B2
(45) Date of Patent: Sep. 29, 2015

(54) METHOD FOR PRODUCING MICROALLOYED TUBULAR STEEL IN COMBINED CASTING-ROLLING INSTALLATION AND MICROALLOYED TUBULAR STEEL

(71) Applicants: Bernd Linzer, Linz (AT); Axel Rimnac, Linz (AT)

(72) Inventors: Bernd Linzer, Linz (AT); Axel Rimnac, Linz (AT)

(73) Assignee: PRIMETALS TECHNOLOGIES AUSTRIA GMBH, Linz (AT)

( * ) Notice: Subject to any disclaimer, the term of this patent is extended or adjusted under 35 U.S.C. 154(b) by 52 days.

(21) Appl. No.: 14/023,021

(22) Filed: Sep. 10, 2013

(65) Prior Publication Data

US 2014/0072824 A1  Mar. 13, 2014

(30) Foreign Application Priority Data

Sep. 10, 2012  (AT) .................................. A 989/2012

(51) Int. Cl.
| | |
|---|---|
| *B22D 11/00* | (2006.01) |
| *B21B 1/46* | (2006.01) |
| *F16L 9/02* | (2006.01) |
| *C22C 38/00* | (2006.01) |

(52) U.S. Cl.
CPC ............ *B22D 11/006* (2013.01); *B22D 11/001* (2013.01); *C22C 38/00* (2013.01); *F16L 9/02* (2013.01); *B21B 1/463* (2013.01); *Y10T 428/12292* (2015.01)

(58) Field of Classification Search
CPC ..... B22D 11/001; B22D 11/006; B21B 1/463
USPC ......... 164/452, 460, 476, 477, 417; 29/527.6, 29/527.7; 148/544
See application file for complete search history.

(56) References Cited

U.S. PATENT DOCUMENTS

| | | |
|---|---|---|
| 5,915,457 A | 6/1999 | Pleschiutschnigg |
| 6,511,557 B2 | 1/2003 | Arvedi |
| 7,143,499 B2 | 12/2006 | Seidel et al. |
| 8,011,418 B2 | 9/2011 | Rosenthal et al. |
| 8,608,873 B2 | 12/2013 | Abratis et al. |
| 2006/0243420 A1 | 11/2006 | Flemming et al. |
| 2010/0043513 A1 | 2/2010 | Hammer et al. |

(Continued)

FOREIGN PATENT DOCUMENTS

| | | |
|---|---|---|
| CN | 1321112 | 11/2001 |
| CN | 101848780 | 9/2010 |

(Continued)

OTHER PUBLICATIONS machine translation of CN 103160746.*

(Continued)

*Primary Examiner* — Kevin P Kerns
(74) *Attorney, Agent, or Firm* — Staas & Halsey LLP

(57) ABSTRACT

A method produces microalloyed tubular steel from a steel melt having a chemical composition of 0.04-0.05% C, 1.3-1.5% Mn, 0.035-0.05% Nb, 0.035-0.06% V, 0.2-0.4% Cr, 0.2-0.3% Si, >0.015% Al and <0.008% N in percent by weight, the remainder consisting of Fe and unavoidable impurities. The method includes roughening an uncut thin slab strand formed from the steel melt to form a rough strip, reheating the rough strip to produce a reheated rough strip, and finish-rolling the descaled rough strip in a first group of rolling stands and in a second group of the rolling stands.

21 Claims, 4 Drawing Sheets

(56) References Cited

U.S. PATENT DOCUMENTS

| | | | |
|---|---|---|---|
| 2010/0065161 A1 | 3/2010 | Hammer et al. | |
| 2010/0096047 A1 | 4/2010 | Hammer et al. | |
| 2011/0126944 A1* | 6/2011 | Kami et al. | 148/504 |
| 2012/0175076 A1 | 7/2012 | Seidel et al. | |
| 2012/0279620 A1* | 11/2012 | Tanahashi et al. | 148/602 |

FOREIGN PATENT DOCUMENTS

| | | | |
|---|---|---|---|
| CN | 102149842 | 8/2011 | |
| CN | 103160746 * | 6/2013 | C22C 38/38 |
| DE | 100 47 044 A1 | 4/2002 | |
| DE | 102009037278 A1 | 2/2011 | |
| EP | 1 918 403 A1 | 5/2008 | |
| EP | 1 918 405 A1 | 5/2008 | |
| EP | 1 918 406 A1 | 5/2008 | |
| EP | 2 441 538 A1 | 4/2012 | |

OTHER PUBLICATIONS

Office Action dated Nov. 14, 2014 in corresponding Chinese Patent Application No. 201310408797.4.

* cited by examiner

METHOD FOR PRODUCING MICROALLOYED TUBULAR STEEL IN COMBINED CASTING-ROLLING INSTALLATION AND MICROALLOYED TUBULAR STEEL

CROSS REFERENCE TO RELATED APPLICATIONS

This application is based on and hereby claims priority to Austrian Application No. A989/2012 filed on Sep. 10, 2012, the contents of which are hereby incorporated by reference.

BACKGROUND

Described below is a method for producing microalloyed tubular steel in a combined casting-rolling installation, and to the microalloyed tubular steel which can be produced by applying the method.

Microalloyed steels are those to which 0.01 to 0.1 percent by mass of niobium, vanadium or titanium (or even higher contents of the cited elements in combination) is alloyed in order to achieve high strength, e.g. by forming carbides and nitrides and grain refining. The alloying elements disperse partially during heating to deformation temperature. They are dispersed in the austenite and result in an increase in the recrystallization temperature. During the transformation of the shaped austenitic grain into ferrite and pearlite, bainite or even martensite, a refined transformation microstructure is formed according to the degree of deformation. In addition, carbides form in the case of carbon and nitrides form in the case of nitrogen during cooling. The grain refining achieved in this way increases the strength, essentially without reducing the toughness.

The yield point is a characteristic material value and denotes the maximal stress which a material will withstand before exhibiting any visible plastic deformation when subjected to a simple and zero-torque tensile load. If the yield point is exceeded, the material no longer returns to its original shape when the load is reduced, and an extension of the specimen remains. The yield point is generally determined during the tensile test and specified in the unit $N/mm^2=MPa$.

Steel grades having a minimal yield point of at least 485 $N/mm^2$ are required for the API 5L-X70 and API 5L-X80 standards (or higher) of the American Petroleum Institute (API). For example, steel according to the standard API 5L-X70 has a yield point of at least 485 $N/mm^2$ and a tensile strength of at least 570 $N/mm^2$.

This standard is used to designate steel products which can be used in the production of tubes by welding for the purpose of pipeline construction, and which must therefore have a specific strength but must also be highly ductile at low temperatures. The production of such steel products requires specific types of methods.

Existing manufacturing methods for such steels usually require the following conditions to be satisfied:

Only pure iron with low sulfur and phosphorous content is suitable for the steel composition, and the addition of microalloying elements such as niobium Nb, titanium Ti or vanadium V is required in order to achieve a fine grain.

Suitable temperature management is required in order to prevent segregation (dissociation) of the melt during the production of the slab. This occurs at the transition point of the melt into the solid state and results in different material properties within the slab. Suitable temperature management can also be used to prevent cracking in the second ductility minimum.

The rolling of the slab is effected by so-called thermomechanical rolling:

During roughing, a uniformly heated slab having a relatively coarse-grained microstructure arrives from a heating furnace at the roughing train (roughing mill). In order to achieve recrystallization, during which the relatively coarse-grained microstructure of the slab becomes increasingly fine-grained, the thickness of the steel must be reduced by at least 40%, normally in reversing operation. A fine austenitic grain is required before the rolled stock is shaped further in the finishing train.

During finish-rolling in the finishing train, final shaping takes place in a temperature range at which the material no longer recrystallizes: typically in the temperature range of 800-900° C. In this case, the steel band is stretched by a factor of at least 2.5 and usually more than 3 in order to achieve the desired material properties. Typical intake temperatures of the steel band into the finishing train are between 800° C. and 900° C. The exit temperature of the steel band emerging from the finishing train is typically in the region of 830° C.

Faster cooling of the steel band after it emerges from the finishing train results in the formation of particularly fine ferrite grains, even the development of acicular (needle-shaped) ferrite in some circumstances. This produces an extremely fine-grained transformation microstructure having high strength and very good toughness.

EP 1 978 121 A1 discloses a corresponding method for the production of highly weldable steel sheets having a yield point (yield stress) of at least 350 MPa and a tensile strength of at least 570 MPa, wherein the steel is thermomechanically rolled in the finishing train.

The production of API X70 tubular steel in a combined casting-rolling installation known as "CSP flex" is disclosed in the publication by C. Klein et al.: "Von CSP zu CSP flex—das neue Konzept für die Dünnbrammentechnologie, stahl and eisen 131(2011), No. 11". The proposed production method has the disadvantage that the steel melt must have a relatively high proportion of alloy, in particular niobium, in order to limit the grain growth of the cut thin slab strand in the heating furnace (usually a tunnel furnace). The production costs per ton of finished strip increase due to the high proportion of alloy.

The existing methods have the disadvantage that undesired grain growth can occur due to the long time the steel spends in the heating furnace ahead of the roughing train and/or the finishing train.

SUMMARY

The disadvantages of the prior art may be overcome by a method for the economical production of a microalloyed tubular steel, by which method the microalloyed tubular steel can be produced
- economically, i.e. with low operating costs in respect of the steel melt and low energy costs in respect of the production,
- with operational reliability, i.e. the tubular steel can be produced with almost constant quality even in the event of unavoidable fluctuations in the production process, and
- with high quality.

The method can be used to produce a high-quality tubular steel of the steel grade X70, having a low proportion of alloying elements in comparison with the prior art while nonetheless having comparatively good mechanical properties.

Specifically, the method produces a microalloyed tubular steel in a combined casting-rolling installation, wherein the combined casting-rolling installation comprises a continuous casting machine featuring a mold and a strand guide, a roughing train featuring one or more stands, an induction furnace, a descaling device, a multi-stand finishing train, a cooling section and a storage device, the method including:
casting a steel melt in the mold into a partially solidified thin slab strand, wherein the steel melt consists of 0.04-0.05% C, 1.3-1.5% Mn, 0.035-0.05% Nb, 0.035-0.06% V, 0.2-0.4% Cr, 0.2-0.3% Si, 0.015-0.05% Al and <0.008% N in percent by weight, the remainder consisting of Fe and unavoidable impurities;
deflecting the partially solidified thin slab strand into a curved strand guide;
supporting, guiding and cooling the thin slab strand in the curved strand guide;
deflecting the thin slab strand into a horizontal strand guide, wherein the thin slab strand solidifies totally either in the curved strand guide or in the horizontal strand guide;
roughing the uncut thin slab strand to form a rough strip in the roughing train, wherein the thin slab strand has a core temperature which is at least 50° C., or at least 100° C., higher than its surface temperature when it enters the roughing train, and the thin slab strand is roughed in the roughing train by a total reduction factor of at least 40%, or at least 50%, and complete static recrystallization of the microstructure occurs during the roughing;
reheating the rough strip in the induction furnace to an average rough strip temperature of >1000° C.;
descaling the reheated rough strip in the descaling device;
finish-rolling the descaled rough strip in a first group of rolling stands of the finishing train to form a partially finish-rolled rough strip, wherein the microstructure of the rough strip at least partially, or even completely, statically recrystallizes following a reduction stage in the first group of rolling stands of the finishing train; then immediately
finish-rolling the partially finish-rolled rough strip in a second group of rolling stands of the finishing train to form a finished strip, wherein the microstructure of the partially finish-rolled rough strip does not recrystallize;
cooling the finished strip in the cooling section;
cutting and storing the finished strip in the storage device.

"Dynamic recrystallization" signifies the recrystallization of the shaped microstructure while in the roll gap. The dynamic recrystallization is complete when the material exits from the roll gap. Unlike static recrystallization, the dynamic recrystallization is moreover stimulated by high deformation rates. By comparison, "static recrystallization" is understood to mean the recrystallization of the shaped microstructure outside the roll gap. The static recrystallization is primarily stimulated by high degrees of deformation.

By virtue of the method described below, it is possible to cast a significantly less alloyed steel melt in the continuous casting machine (0.06% Nb is required in the CSP flex producing method, whereas good results can be achieved with just 0.035% Nb using the method), whereby the production costs can be reduced and the weldability of the tubular steel can be improved as a result of the smaller proportions of alloys. The thin slab strand typically emerges from the mold in a vertical direction (in the case of a straight mold) or in an essentially vertical direction (in the case of a curved mold) and is then bent round into a curved strand guide.

In order to carry forward as much casting heat as possible from the continuous casting process into the roughing and finish-rolling process, it is advantageous if the thin slab strand in the strand guide does not solidify totally until shortly (typically a few meters) before roughing in the roughing train.

During roughing, complete static recrystallization of the cast microstructure of the uncut thin slab strand occurs in the context of relatively low mass flow, the inverse temperature profile (i.e. when the core temperature of the thin slab strand is at least 50° C. higher than its surface temperature) of the thin slab strand allowing all cross-sections of the thin slab strand to be almost uniformly reduced and uniformly recrystallized in the roughing train. This ensures that the core region of the rough strip likewise has a fine-grained microstructure. The coarse-grained cast microstructure is completely transformed into a fine-grained rolled microstructure as a result of the complete static recrystallization.

Since the rough strip still holds a very large amount of casting heat from the continuous casting process, it is generally sufficient to reheat the rough strip using a modest energy input. An induction furnace may be used for this purpose. By virtue of the induction furnace, it is possible to react quickly to changing conditions (e.g. changed casting speeds due to a change of ladle in the continuous casting machine), while nonetheless ensuring that the intake temperature into the finishing train and/or the final rolling temperature at the final reduction stage of the finishing train remains constant. Moreover, the induction furnace allows the cross-section of the rough strip to be heated considerably more uniformly than is possible in the case of a tunnel furnace, while the frequency with which the inductors receive current is relatively low. Furthermore, by virtue of the rapid reheating in the induction furnace, the grain growth is kept low and embrittlement at the grain boundaries of the austenite is reduced or largely prevented.

After the reheating, the rough strip is descaled. This can be omitted if the induction furnace is operated in an inert or reducing atmosphere.

The finish-rolling of the rough strip in the finishing train takes place in two operations. The rough band is finish-rolled in a first group of rolling stands of the finishing train, thereby causing at least partial static recrystallization, to form a partially finish-rolled rough strip. A particularly fine-grain microstructure is produced in this way. Immediately thereafter, the partially finish-rolled rough strip is finish-rolled in a second group of rolling stands of the finishing train without recrystallization, i.e. thermomechanically, to finished strip thickness.

After the finish-rolling, the finished strip is quickly cooled to storage temperature (i.e. winding temperature for a coil or output temperature for delivery of plates), such that the finished strip has particularly fine-grain ferrite and bainite grains.

Finally, the cooled finished strip is cut according to coil weight or plate length and in stored in a storage device, e.g. at least one coiler device for so-called coils or an output device for plates.

Precipitation hardening of the finished strip compensates for a reduction in the achievable strengths of the finished strip, which reduction inevitably occurs in the case of known process management due to the low proportions of alloying elements (in particular niobium and/or titanium) in the steel melt. The precipitation hardening is assisted by a steeper temperature gradient during finish-rolling on the one hand, while on the other hand the precipitations have less time to grow, such that a finer microstructure occurs overall. By virtue of the finer microstructure, the contribution to the increase in strength from the cutting and circumventing is maximized, such that the increase in strength (precipitation strengthening) due to the precipitation hardening is maximized.

By virtue of the production method, the grain sizes D of the precipitations (e.g. niobium carbide, niobium nitride, vanadium carbide, possibly also titanium nitride) in the finished strip are typically 2 nm≤D≤12 nm.

In an advantageous embodiment, all of the method, from casting the steel melt up to and including the finish-rolling of the partially finish-rolled rough strip, and the cooling of the finished strip if applicable, take place in the context of endless operation.

In an advantageous embodiment, the partially solidified thin slab strand is subjected to LCR (Liquid Core Reduction, i.e. a reduction of the thickness of the thin slab strand when it has not totally solidified or has only partially solidified) in the curved strand guide and/or the horizontal strand guide of the continuous casting machine. During the LCR, the thickness of the thin slab strand is typically reduced between 1 and 30 mm (measured between the outlet of the mold and the point of total solidification).

The produce of a marketable finished strip is facilitated and the number of rolling stands in the roughing and finishing trains is kept low if the totally solidified thin slab strand leaving the continuous casting machine has a thickness of 80-160 mm, or 90-125 mm, most narrowly 95-115 mm. The cited requirements in respect of a marketable finished strip are satisfied in particular by a finished strip having a thickness of 4-26 mm.

It is generally appropriate for the thin slab strand to be roughed by one to three reduction stages in the roughing train.

In a further advantageous embodiment, each reduction stage has a reduction factor of 12-60% as a result of the roughing, wherein in particular a reduction of 30-60% occurs in the first reduction stage, a reduction of 20-60% occurs in the second reduction stage, and a reduction of 12-40% occurs in the third reduction stage.

In order to prevent embrittlement of the austenitic grain and/or excessive grain growth, it is advantageous if one or more reheating phases having a maximal total duration of 120 s, or <90 s, or for as little as <75 s to occur between the roughing train and the finishing train.

The temperature drop which is caused by the descaling can be limited by using a high-pressure descaler, in particular a high-pressure rotation descaler, for the purpose of descaling.

In order to assist the formation of a fine grain during finish-rolling, the partial (or total) static recrystallization of the partially finish-rolled rough strip advantageously occurs after the first or second reduction stage in the first group of rolling stands of the finishing train.

In order to ensure a good surface quality and/or good geometry of the finished strip, provision is advantageously made for the partially finish-rolled rough strip to be finish-rolled without recrystallizing in the second group of rolling stands of the finishing train, wherein a total reduction of ≥50% typically occurs. The smallest reduction of all rolling stands in the finishing train should occur in the last reduction stage of the finishing train.

In order to achieve or maintain an exact finish-rolling temperature, provision is advantageously made for an actual temperature of the partially finish-rolled finished strand to be captured immediately before the final stand of the finishing train by a temperature measuring device and supplied to a regulator, and for the regulator to calculate a control variable on the basis of a desired temperature and activate at least one inductor of the induction furnace such that the actual temperature matches the desired temperature as closely as possible. The desired temperature, i.e. the finish-rolling temperature, is normally set between 780° C. and 850° C.

In order to achieve a maximal strength of the finished strip, provision is advantageously made for the surface of the finished strip to be cooled at a cooling speed of ≥10 K/s in the cooling section.

In order to increase the strength of the finished strip further by developing titanium nitrides or titanium carbides, a steel melt content of <1000 ppm Ti is sufficient.

The microalloyed tubular steel may have a chemical composition of 0.04-0.05% C, 1.3-1.5% Mn, 0.035-0.05% Nb, 0.035-0.06% V, 0.2-0.4% Cr, 0.2-0.3% Si, >0.015% Al and <0.008% N in percent by weight, the remainder consisting of Fe and unavoidable impurities, wherein at least 75% of the precipitations of the tubular steel have a size of 2 nm≤D≤12 nm at room temperature and the tubular steel satisfies the mechanical requirements for the steel grade X70 as per the standard API 5L/ISO3183:2007. The grain size of the tubular steel is typically between 4 and 8 μm.

BRIEF DESCRIPTION OF THE DRAWINGS

These and other aspects and advantages will become more apparent and more readily appreciated from the following description of exemplary embodiments, taken in conjunction with the accompanying drawings of which.

DETAILED DESCRIPTION OF THE PREFERRED EMBODIMENT

Figure 1:
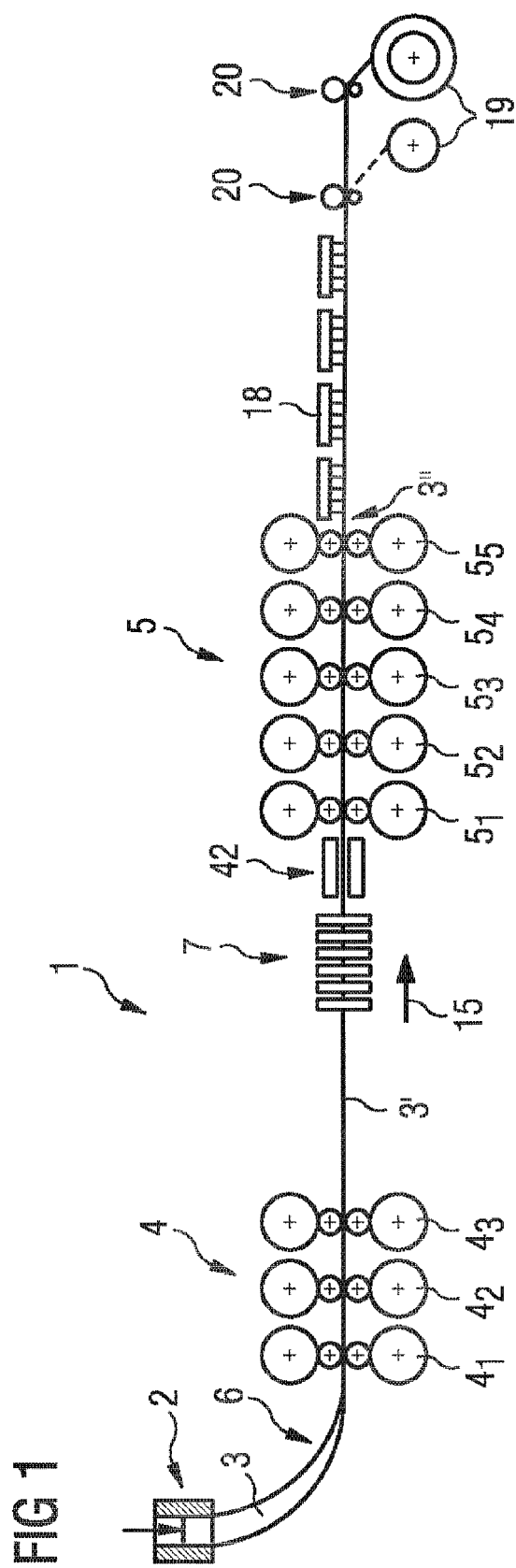
FIG. 1 is a schematic block diagram of a combined casting-rolling installation for the continuous production of microalloyed tubular steel in a side view.

Reference will now be made in detail to the preferred embodiments, examples of which are illustrated in the accompanying drawings, wherein like reference numerals refer to like elements throughout.

FIG. 1 schematically shows a combined casting-rolling installation 1 in which the method for endless rolling of hot steel band can be carried out.

A continuous casting machine is shown, featuring a mold 2 in which strands 3 are cast. Connected to the mold 2 is a strand guide 6. This is followed by the roughing in a roughing train 4, which consists here of three rolling stands $4_1$, $4_2$, $4_3$ and in which the strand 3 is rolled to form a rough strip 3'. The transformation from cast microstructure into fine-grained rolled microstructure occurs during the roughing. The transport direction of the rough strip 3' is shown by the arrow 15.

The combined casting-rolling installation 1 further comprises a series of components such as e.g. a descaling device 42 and separating devices (not shown in FIG. 1), which essentially correspond to the known art and are therefore not described in further detail here. The separating devices, which are embodied e.g. in the form of high-speed shearing machines, are in any case disposed downstream of the finishing train 5 and are used to separate the finish-rolled steel bands into plates or coils from the following band. The shearing machine can cut through thicknesses up to 26 mm at band speeds of 0.3 to 5 m/s, either by coordinated movement of the complete shearing machine or at least one drum pair which is synchronized with the band speed, wherein a relationship applies as follows between the thickness d and the width b of the steel band and the band speed v as a function of the width-specific throughput in the context of the endless casting rolling process:

$$v*b=0.350\ldots0.600\ \text{m}^2/\text{min or}$$

$$v*b=0.006\ldots0.012\ \text{m}^2/\text{s}.$$

It is naturally possible to arrange further separating devices at other positions in the combined casting-rolling installation 1, e.g. ahead of the roughing train 4, or between the roughing train 4 and the finishing train 5.

An induction furnace 7 for the rough strip 3' is arranged after the roughing train 4. Provision may be made for use of a cross-field heating induction furnace, making the combined casting-rolling installation 1 particularly energy-efficient. In the induction furnace 7, the rough strip 3' is heated in a relatively uniform manner over its cross-section to a desired intake temperature for the intake into the finishing train 5.

After the heating in the induction furnace 7, and after intermediate optional descaling in the descaling device 42, finish-rolling to a desired final thickness and final rolling temperature of the finished strip 3" takes place in the five-stand finishing train 5 by the finishing stands $5_1, 5_2, 5_3, 5_4, 5_5$, followed by band cooling in a cooling section 18 and finally winding onto coils by underfloor coilers 19. Just in front of the underfloor coilers 19, the finished strip 3" is squeezed between drive rollers 20, whereby the finished strip 3" is guided and band tension is maintained.

The so-called LCR (Liquid Core Reduction) method can be used for the continuous casting, wherein the strand 3 emerging from the mold 2 is reduced by the subsequent strand guide 6 while the cross-sectional core of the strand 3 is still liquid.

For the purpose reducing the thickness of the strand 3 by LCR, guide elements 9, 10 (typically strand guide rollers) of the strand guide 6, being designed to provide contact with the strand, can be (transversely) adjusted relative to a longitudinal axis of the strand 3, the adjustment of the guide elements being performed as a function of the material of the strand and/or the casting speed, in order to reduce the strand thickness by up to 30 mm.

Figure 2:
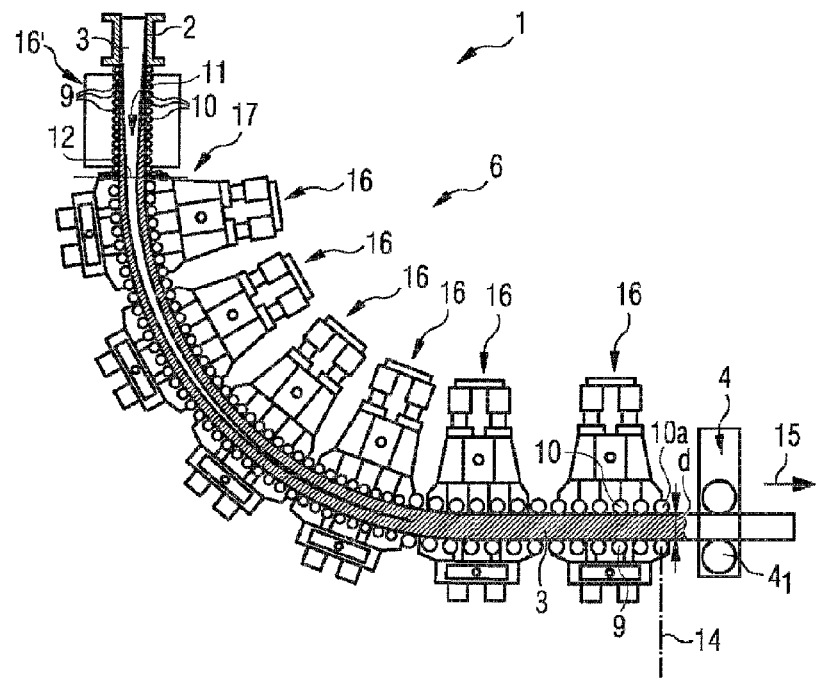
FIG. 2 is a detailed illustration of a strand guide of the plant from FIG. 1 in a vertical sectional view.

According to FIG. 2, the strand guide 6 comprises a plurality (usually three to fifteen) strand guide segments 16, wherein each segment 16 comprises one or more (usually three to ten) pairs of guide elements 9, 10, these may be embodied as strand support rollers. The support rollers can rotate about an axis running orthogonally relative to the transport direction of the strand 3. Individual guide elements could also conceivably be embodied as static e.g. runner-type components instead of strand support rollers. Irrespective of the actual embodiment of the guide elements 9, 10, these are disposed on both sides of the strand surfaces, such that the strand is guided by upper and lower series of guide elements.

As shown in FIG. 2, the guide segments 16 comprise in each case a lower series of guide elements 9 and an upper series of guide elements 10, the latter being arranged parallel with or converging with the lower series of guide elements 9. Each guide element 9 of the lower series of guide elements is assigned to an opposing guide element 10 of the upper series of guide elements.

A receiving slot 11 for receiving a strand 3 that emerges from the mold 2 is formed between the two series of guide elements 9, 10, the receiving slot 11 being tapered at least sectionally by forming different distances between opposing guide elements 9, 10 in a transport direction of the strand 3, thereby allowing the strand 3 to be reduced in thickness.

The upper and lower guide elements or support rollers 9, 10 can in each case be divided in turn into (sub-) series of specific support rollers having different diameters and/or distances between axes.

The upper guide elements 10 can be selectively adjusted in respect of depth and moved closer to the lower guide elements 9, e.g. by a hydraulic drive. An internal receiving width 12 of the receiving slot 11 of the strand guide 6, corresponding to the desired strand thickness d at the end 14 of the strand guide 6 and being measured between opposing upper and lower guide elements, could be reduced from 125 mm to a range of between 95 mm and 115 mm, for example.

Since a strand 3 that is guided in a narrower receiving slot 11 solidifies and cools more quickly, the casting speed and correspondingly the volume flow passing through the mill trains 4, 5 must be increased if it is intended that the molten core tip of the strand should nonetheless extend as closely as possible to the end of the strand guide 6.

For the purpose of reducing the thickness of the strand 3, e.g. three to eight (pairs of) guide elements 9, 10 of a first guide segment 16' which faces the mold 2 but is not necessarily adjoined to the mold 2 can be adjusted. Alternatively, a larger number of sequential guide segments 16 which directly or indirectly adjoin the mold 2 can also be used for the purpose of LCR thickness reduction.

The strand thickness d or the internal receiving width 12 can be set as a function of the material of the strand 3 and/or as a function of the casting speed. The adjustment of the respective guide elements 9, 10 is effected in a direction that is essentially orthogonal relative to the transport direction of the strand, wherein both the upper guide elements 10 and the lower guide elements 9 can be adjustable. The upper guide elements 10 are linked to corresponding support elements 17, which may be hydraulically adjustable.

The (hydraulically) adjustable LCR guide elements 9, 10 may be disposed in a front half nearest to the mold, and may be in a front quarter nearest to the mold, of the longitudinal extension of the strand guide 6.

Use of the LCR method results in particularly low segregation rates, since it is possible both to achieve a finer solidification microstructure and to inhibit macrosegregations by the more intensive intermixing of the melt that is associated with the LCR method.

Only such cooling of the strand 3 as is caused by the ambient temperature, this being very low relative to the strand surface, is permitted between the end 14 of the strand guide 6 and an intake region of the roughing train 4, i.e. no artificial cooling of the strand 3 by a cooling device takes place. The surface of the strand 3 has an average temperature of >1050° C., or >1000° C. in this region. However, a hinged thermal cover may also be provided between the end 14 of the strand guide 6 and the first roughing stand $4_1$, in order to preserve the heat in the strand 3 as far as possible. The thermal cover at least sectionally surrounds a conveyor device which is provided for transporting the strand 3 and is usually embodied as a roller conveyor. The thermal cover can surround the conveyor device from above and/or from below and/or from the side.

In this context, the end 14 of the strand guide 6 is understood to mean the active guiding surface or surface line, which provides contact with the strand, of the last guide element (or last support roller 10a of the upper guide elements 10) facing the roughing train 4.

The following operations are carried out in the combined casting-rolling installation 1: In a mold 2 of the continuous casting plant, a partially solidified thin slab strand 3 having a thickness of 100 mm immediately after the mold 2 is first cast from a steel melt consisting of 0.04% C, 1.3% Mn, 0.035% Nb, 005% V, 0.2% Cr, 0.2% Si, 0.03% Al and <0.008% N percent by weight, the remainder consisting of Fe and unavoidable impurities. The strand 3 is then reduced using the Liquid Core Reduction (LCR) method by the strand guide 6 to a strand thickness d of 85 mm while the cross-sectional core is still liquid. Following the LCR, the total solidification of the strand 3 occurs shortly before the end of the curved strand guide 6.

The subsequent roughing, reheating and finish-rolling is illustrated below with reference to the pass schedule according to Table 1. A steel melt having the chemical composition specified the previous paragraph is used as a starting material in this example. The starting material is used to cast a strand having a thickness of 85 mm and a width of 1900 mm at a casting speed of 5.0 m/min.

In the first example, a band having a final thickness of 6 mm and a final width of 1900 mm is rolled from this.

The individual rolling stands and other devices of the roughing and finishing trains are each specified in the first column of Table 1, where "H in" designates the entry to the induction furnace 7 (its beginning), "H out" designates the exit of the rough strip 3' from the induction furnace 7 (its end), and "Descal." designates the descaling device 42.

The further columns are used to list:
the thickness of the steel band in mm, measured after passing through the respective rolling stand,
the reduction (decrease in thickness) of the steel band in the relevant rolling stand relative to the thickness of the preceding rolling stand, and
the temperature of the steel band in ° C. at the respective rolling stand or at the entry and exit of the induction furnace 7.

TABLE 1

| Stand | Thickness [mm] | Red. [%] | Temp. [° C.] |
| --- | --- | --- | --- |
| $4_1$ | 42.5 | 50 | 1108 |
| $4_2$ | 21.25 | 50 | 1062 |
| $4_3$ | 19 | 11 | 1026 |
| H in | 19 | | 905 |
| H out | 19 | | 1050 |
| Descal. | 19 | | 1043 |
| $5_1$ | 10.45 | 45 | 960 |
| $5_2$ | 7.315 | 30 | 910 |
| $5_3$ | 6.58 | 10 | 870 |
| $5_4$ | 6.06 | 5 | 835 |
| $5_5$ | 6 | 1 | 805 |

In the first example, the strand 3 therefore has a thickness d of 85 mm and a temperature in the region of 1130-1300° C. when it emerges from the strand guide 6 and arrives at the first rolling stand $4_1$ of the roughing train 4. When it enters the roughing train 4, the thin slab strand 3 has a core temperature which is at least 50° C. higher than the surface temperature of the uncut strand. The strand 3 is reduced by 50% to a thickness of 42.5 mm in the first stand $4_1$ of the roughing train 4, thereby cooling to 1108° C. A further pass giving a reduction of 50% to 21.3 mm thickness occurs in the second rolling stand $4_2$. The strand 3 now has a temperature of 1062° C. when it exits the second rolling stand $4_2$. A third pass no longer occurs in the roughing train 4. While traveling through the third rolling stand $4_3$ (without reduction) and before entering the induction furnace 7, the rough strip 3' cools down to 905° C. without forced cooling, i.e. due to the radiation alone of the rough strip 3'. This cooling can be restricted by covers, for example.

The rough strip 3' is reheated in the induction furnace 7, and consequently has a temperature of 1050° C. when it emerges from the induction furnace 7. As a result of the descaling in the descaling device 42, the rough strip 3' cools down to 1043° C. and has approximately this temperature when it enters the first rolling stand $5_1$ of the finishing train 5. A reduction takes place in five passes there, i.e. using all rolling stands $5_1$ to $5_5$ of the finishing train 5 as per the values in Table 1. The finished strip 3" has a final temperature of 805° C. when it emerges from the finishing train 5.

Following the first reduction stage in the rolling stand $5_1$ or the second reduction stage in the rolling stand $5_2$ of the finishing train 5, a partial static recrystallization of the microstructure occurs. The recrystallization stop temperature of the steel in use is 900° C. No recrystallization of the microstructure occurs in the final three reduction stages $5_3$, $5_4$, $5_5$ of the finishing train 5, i.e. only the so-called thermomechanical rolling takes place.

In the present exemplary embodiment, the finished strip 3" is subsequently cooled to a coiler temperature of between 500° C. and 750° C., or between 550° C. and 650° C., and wound into a coil. The cooling of the finished strip in the cooling section 18 takes place at a cooling speed of 15 K/s, such that the finely dispersed precipitations in the finished strip are "locked in" to the microstructure, thereby maximizing the increase in strength of the finished strip as a result of the precipitation hardening. Finally, the finished strip 3" is severed transversely relative to its transport direction 15 and the finished strip 3", being now disconnected from the mill train, is finish-coiled. As an alternative to coiling, the finished strip 3" can also be redirected and stacked.

The heating of the rough strip 3' takes place within a time period of 20 to 50 seconds. The finishing stands $5_1$-$5_5$ are arranged in each case at distances of <7 m or at distances of <5 m relative to each other (measured between the working roll axes of the finishing stands $5_1$-$5_5$). The working roll diameter of the roughing stands is 670-750 mm in the plant installation to FIG. 1.

The resulting tubular steel of 6 mm thickness has a measured grain diameter of 5.2 µm at room temperature. The tensile strength is 594 N/mm$^2$.

Figure 3:
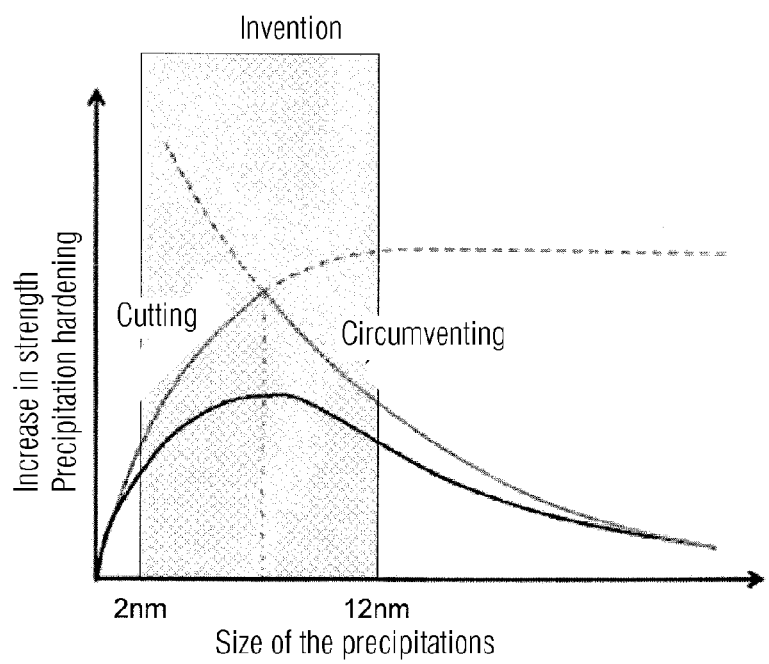
FIG. 3 is a graph of the increase in strength provided by the method as a result of precipitation hardening.

FIG. 3 schematically shows the contribution of the production method to the increase in strength of the finished strip 3" as a result of the precipitation hardening. The sizes of the precipitations (primarily niobium carbide, niobium nitride and vanadium carbide in this case) may lie between 2 and 12 nm, compared with 15 to 30 nm in the case of a production method according to the known art. Owing to the size of the precipitations, the strength-enhancing contributions from the cutting and circumventing are maximized in the context of precipitation hardening, such that the less alloyed tubular steel achieves characteristic strength values which are comparable with those of a more alloyed tubular steel that is produced in a known production process.

Figure 4:
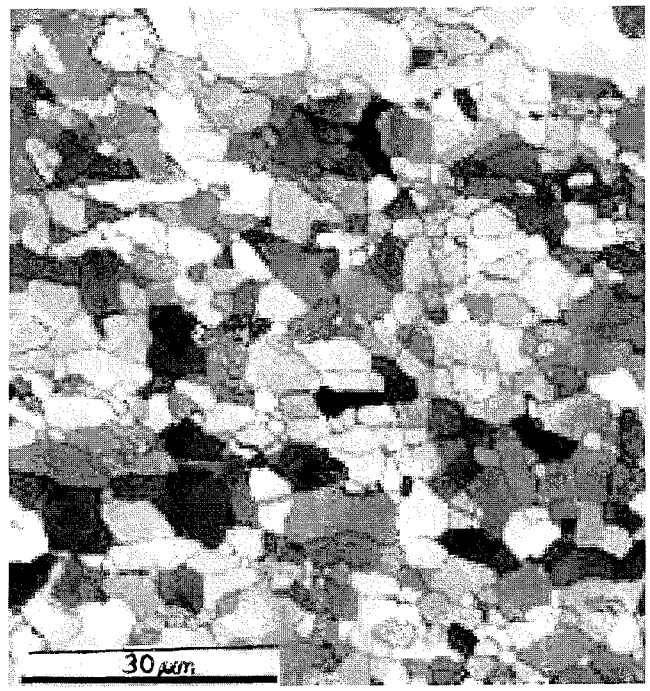
FIG. 4 is an illustration of the microstructure of the finished strip 3" having a final thickness of 6 mm at room temperature.

FIG. 4 shows an illustration of the microstructure of the tubular steel having a thickness of 6 mm in an EBSD (Electron Backscatter Diffraction) microscope. The Italian research institute CSM (Centro Sviluppo Materiali) has confirmed that the tubular steel produced by the method satisfies the requirements for the steel grade X70 as per the standard API 5L/ISO 3183:2007.

Figure 5:
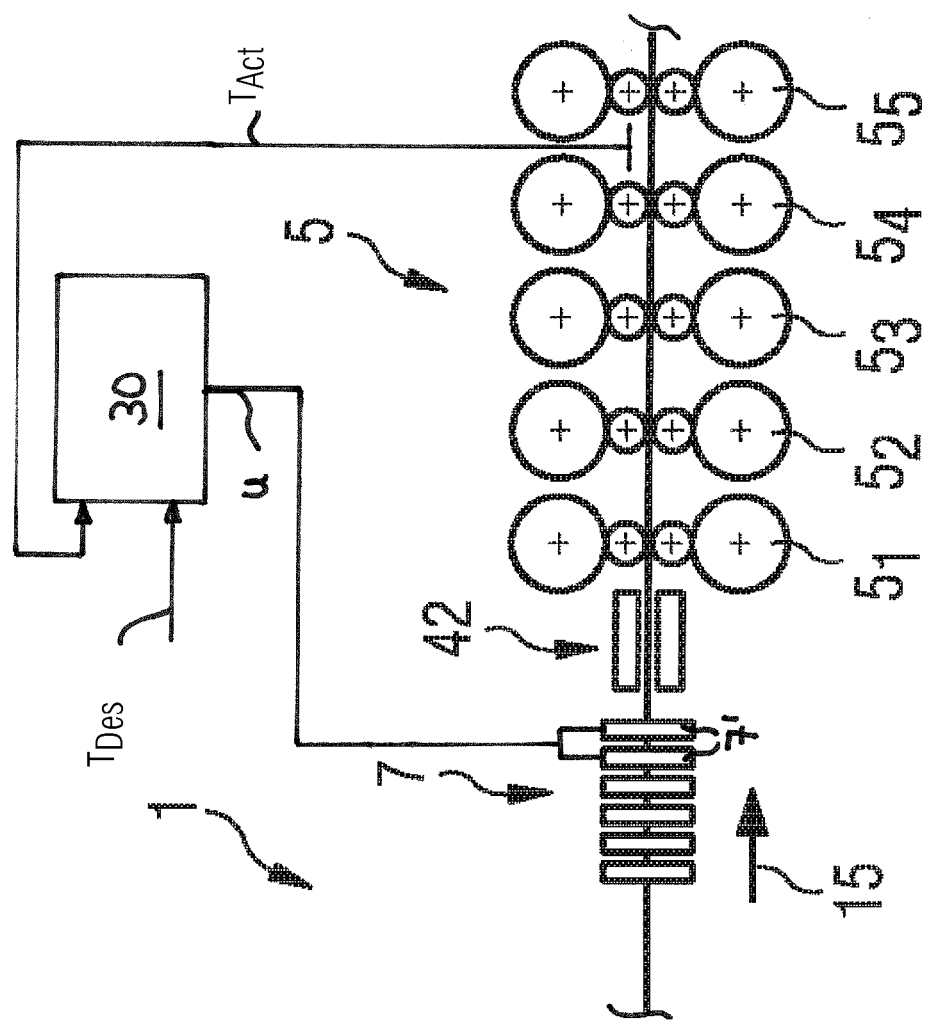
FIG. 5 is a block diagram of a variant of the combined casting-rolling installation from FIG. 1, illustrating the final rolling temperature control.

FIG. 5 shows a variant of the combined casting-rolling installation from FIG. 1, to illustrate the final rolling temperature control. Either shortly before the partially finish-rolled rough strip 3' passes through the last stand $5_5$ of the finishing train, or shortly after the finished strip 3" has passed through the last stand $5_5$ of the finishing train 5, the actual temperature $T_{Act}$ of the rough strip 3' or of the finished strip 3" is measured by a temperature measuring device (not shown) such as a pyrometer, for example. The regulating error e between a desired temperature $T_{Des}$ (specifically the desired final rolling temperature) and the actual temperature $T_{Act}$ is calculated by an analog or digital regulator 30, wherein the regulator 30 outputs a control variable u and activates at least one inductor 7' of the induction furnace 7 (the last two cross-field inductors 7' in this specific case) such that the actual temperature $T_{Act}$ matches the desired temperature $T_{Des}$ as precisely as possible. The actual temperature of the band is therefore maintained with a high level of precision at the final rolling temperature, even in the event of fluctuations in the production process (e.g. a reduction in the casting speed during a ladle change).

A description has been provided with particular reference to preferred embodiments thereof and examples, but it will be understood that variations and modifications can be effected within the spirit and scope of the claims which may include the phrase "at least one of A, B and C" as an alternative expression that means one or more of A, B and C may be used, contrary to the holding in *Superguide* v. *DIRECTV*, 358 F3d 870, 69 USPQ2d 1865 (Fed. Cir. 2004).

What is claimed is:

1. A method for producing microalloyed tubular steel in a combined casting-rolling installation using a continuous casting machine featuring a mold and a strand guide, a single-stand or multi-stand roughing train, an induction furnace, a descaling device, a multi-stand finishing train, a cooling section and a storage device, said method comprising:
    casting a steel melt in the mold to form a partially solidified thin slab strand, the steel melt consisting of 0.04-0.05% C, 1.3-1.5% Mn, 0.035-0.05% Nb, 0.035-0.06% V, 0.2-0.4% Cr, 0.2-0.3% Si, 0.015-0.05% Al and <0.008% N in percent by weight, the remainder consisting of Fe and unavoidable impurities;
    deflecting the partially solidified thin slab strand into a curved strand guide;
    supporting, guiding and cooling the thin slab strand in the curved strand guide;
    deflecting the thin slab strand into a horizontal strand guide, the thin slab strand solidifying totally either in the curved strand guide or in the horizontal strand guide to form an uncut thin slab strand;
    roughing the uncut thin slab strand to form a rough strip in the roughing train, the uncut thin slab strand having a core temperature at least 50° C. higher than a surface temperature of the uncut thin slab strand when the uncut thin slab strand enters the roughing train, the thin slab strand roughed in the roughing train by a total reduction factor of at least 40% with complete static recrystallization of a first microstructure occurring during the roughing;
    reheating the rough strip in the induction furnace to an average rough strip temperature of greater than 1000° C. to produce a reheated rough strip;
    descaling the reheated rough strip in the descaling device to produce a descaled rough strip;
    finish-rolling the descaled rough strip in a first group of rolling stands of the finishing train to form a partially finish-rolled rough strip having a second microstructure at least partially statically recrystallized following a reduction stage in the first group of rolling stands of the finishing train; then immediately
    finish-rolling the partially finish-rolled rough strip in a second group of the rolling stands of the finishing train to form a finished strip in which the second microstructure does not recrystallize;
    cooling the finished strip in the cooling section;
    cutting and storing the finished strip in the storage device.

2. The method as claimed in claim 1, wherein the core temperature of the uncut thin slab strand is at least 100° C. higher than the surface temperature of the uncut thin slab strand when the uncut thin slab strand enters the roughing train.

3. The method as claimed in claim 2, wherein the thin slab strand is roughed in the roughing train by the total reduction factor of at least 50%.

4. The method as claimed in claim 3, wherein the partially solidified thin slab strand is subjected to liquid core reduction in the curved strand guide and/or the horizontal strand guide of the continuous casting machine.

5. The method as claimed in claim 4, wherein the totally solidified thin slab strand emerges from the continuous casting machine having a thickness of 80-160 mm.

6. The method as claimed in claim 4, wherein the totally solidified thin slab strand emerges from the continuous casting machine having a thickness of 90-125 mm.

7. The method as claimed in claim 4, wherein the totally solidified thin slab strand emerges from the continuous casting machine having a thickness of 95-115 mm.

8. The method as claimed in claim 7, wherein the thin slab strand is roughed by one to three reduction stages in the roughing train.

9. The method as claimed in claim 4, wherein each reduction stage has a reduction factor of 12-60%, wherein in particular a reduction of 30-60% occurs in the first reduction stage, a reduction of 20-60% occurs in the second reduction stage, and a reduction of 12-40% occurs in the third reduction stage.

10. The method as claimed in claim 9, wherein at least one reheating phase having a maximal total duration of 120 seconds occurs between the roughing train and the finishing train.

11. The method as claimed in claim 10, wherein the maximal total duration of the at least one reheating phase between the roughing train and the finishing train is less than 90 seconds.

12. The method as claimed in claim 11, wherein the maximal total duration of the at least one reheating phase between the roughing train and the finishing train is less than 75 seconds.

13. The method as claimed in claim 12, wherein the descaling is effected by a high-pressure descaler.

14. The method as claimed in claim 13, wherein the high-pressure descaler is a rotation descaler.

15. The method as claimed in claim 14, wherein at least partial static recrystallization of the partially finish-rolled rough strip occurs after the first or the second reduction stage in the first group of the rolling stands of the finishing train.

16. The method as claimed in claim 13, wherein complete static recrystallization of the partially finish-rolled rough strip occurs after the first or the second reduction stage in the first group of the rolling stands of the finishing train.

17. The method as claimed in claim 16, wherein the partially finish-rolled rough strip is finish-rolled without recrystallizing in the second group of the rolling stands of the finishing train and the total reduction of at least 50% substantially occurring in the second group of the rolling stands.

18. The method as claimed in claim 17, further comprising:
measuring an actual temperature of the partially finish-rolled rough strip immediately before a last stand of the finishing train using a temperature measuring device;
supplying the actual temperature to a regulator;
calculating by the regulator a control variable based on a desired temperature; and
activating at least one inductor of the induction furnace such that the actual temperature substantially matches the desired temperature.

19. The method as claimed in claim 18, wherein the surface of the finished strip is cooled at a cooling speed of greater than 10 K/s in the cooling section.

20. The method as claimed in claim 19, wherein the finished strip has a thickness of 4-26 mm.

21. The method as claimed in claim 20, wherein the steel melt includes less than 1000 ppm Ti.

* * * * *